United States Patent Office 3,467,357
Patented Sept. 16, 1969

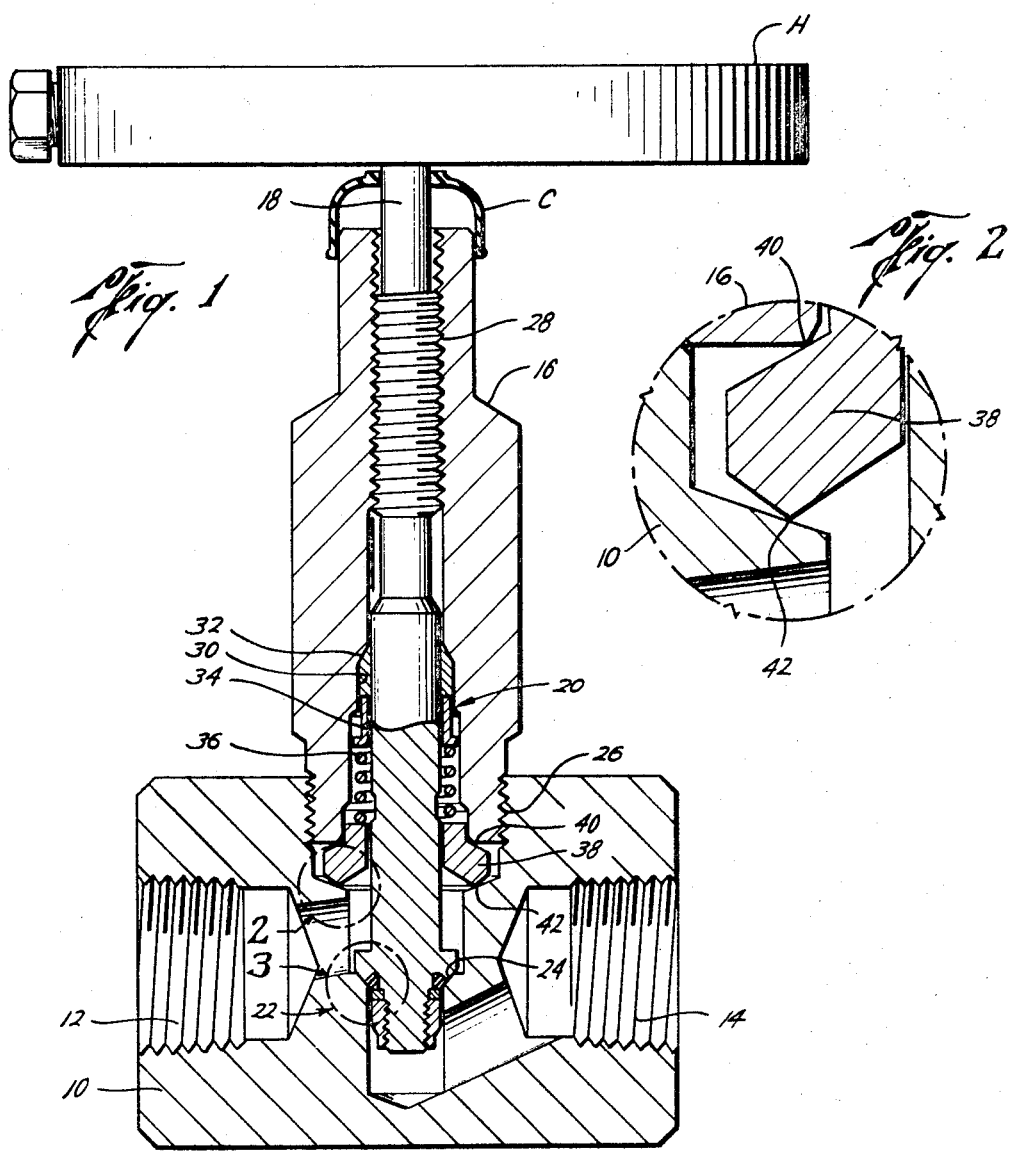

3,467,357
HIGH PRESSURE VALVE
Marion L. Schomer, Houston, and Irvin B. Weise, Bellaire, Tex., assignors to Anderson, Greenwood & Co., Bellaire, Tex., a corporation of Texas
Filed Oct. 22, 1965, Ser. No. 501,489
Int. Cl. F16k 31/50, 41/02, 25/00
U.S. Cl. 251—214          12 Claims

ABSTRACT OF THE DISCLOSURE

A valve suitable for controlling high pressure fluid flow and having a body with an inlet, an outlet and a valve seat, a bonnet secured to the body, a valve member having a seat insert with a frustoconical seating surface and corner angles extending from the seating surface of at least 90°, a ring providing line contact seal between the bonnet and the body, a valve stem connected to the valve member and threaded through the bonnet, and a spring-energized seal between the bonnet and stem between the threads on the stem and the valve member. This abstract is neither intended to define the invention of the application which, of course, is measured by the claims, nor is it intended to be limiting as to the scope of the invention in any way.

The present invention relates to an improved valve for opening and closing the flow through a high pressure line.

Prior to the present invention considerable difficulty has been experienced in valves working on high pressure lines because of the extremely short life of soft seat inserts for the valve members caused by failures due to the bending and shearing off of the upstream corner of the insert and also because of the problems of operating the valve when the threads between the valve stem and the bonnet were exposed to pressure fluid within the valve. The thread difficulty is believed to be due mainly to the leaching of the thread lubricant out of the threads by the fluid flowing through the valve.

It is therefore an object of the present invention to provide an improved high pressure valve having a seal for the valve stem which provides improved thread lubrication by sealing the threads from exposure to the fluids within the valve.

Another object of the present invention is to provide an improved high pressure valve having a greatly increased operating life without failure of the seat seal and without sticking of the stem due to the loss of thread lubricant.

A further object of the present invention it to provide an improved stem seal for a high pressure globe valve in which the sealing ring is urged in sealing relationship to the stem and bonnet by a resilient means.

A further object of the present invention is to provide an improved stem seal for a high pressure globe valve in which resilient means and the pressure within the valve body urge the sealing ring into sealing relationship between the stem and the bonnet.

Another object is to provide an improved high pressure valve having a seal between the bonnet and the body which is provided by line contacts with a separate sealing means.

Still another object is to provide an improved soft seat insert for the valve member of a high pressure globe valve in which the upstream corner of the insert contains sufficient materials to prevent failure due to pressure loading of the seat insert.

A still further object of the present invention is to provide an improved high pressure globe valve having a sealing member between the bonnet and body, which member may be made of material similar to the material of the bonnet and the body.

These and other objects of the present invention are hereinafter more fully set forth and explained in relation to the drawings wherein:

FIGURE 1 is a vertical sectional view of a high pressure valve of the present invention.

FIGURE 2 is an enlarged sectional view illustrating the support member of the valve of the present invention.

FIGURE 3 is another enlarged sectional view of the soft seat insert for the valve member.

The high pressure globe valve of the present invention as illustrated provides an improved stem seal which is urged into a narrowing annular space between the stem and the bonnet at a position between the stem threads and the valve body. This stem seal is urged into position by a spring and also will be urged outwardly into sealing relationship by the pressure contained within the valve body when such pressure exceeds the external pressure. The support member for the spring also acts as a guide for the stem of the valve member and provides substantially a line contact seal with both the bonnet and the body. The configuration of the seal of the spring support member is such that it does not necessarily need to be made of a special material but may be made from a material similar to the material of the bonnet and the body. Additionally, the configuration of the soft seat insert of the valve member is such that it will engage the seat with the pressure above it and it includes sufficient material at its upstream corner to prevent failure due to the pressure loading. The soft seat insert is designed to be reversible and will not be overstressed by a pressure differential in either direction.

As illustrated in FIGURE 1, the valve of the present invention includes the body 10 having an inlet 12 and an outlet 14, the bonnet 16, the valve stem and valve member 18, the stem sealing assembly 20 and the valve member insert assembly 22. The body 10 is suitably drilled to provide a communication between the inlet 12 and the outlet 14 and such communication is surrounded by the valve seat 24. Directly above the valve seat 24 the body is recessed and threaded at 26 to receive the bonnet 16 in threaded engagement therewith whereby the valve member 18 may extend downwardly through the bonnet and the body into position to close the valve seat 24. The stem sealing assembly 20 includes the seal between the valve stem and the bonnet and also a seal between the bonnet and the body. The valve stem 18 is in threaded engagement with the bonnet by the threads 28. This threaded engagement is protected from the fluids in the valve body 10 by the stem sealing assembly 20.

The bonnet 16 is provided with an annular recess 30 surrounding the valve stem 18. The upper end of recess 30 tapers or narrows inwardly toward the valve stem to provide a gradual reduction in annular cross-sectional area of the recess 30. The seal ring 32, the follower ring 34, the spring 36 and the spring support ring 38 are all included as parts of the stem sealing assembly. The seal ring 32 is positioned in the upper portion of the recess 30 with the upper end of the seal ring 32 being tapered to engage the taper of the recess 30. The follower ring 34 is positioned immediately below the seal ring 32 and in engagement therewith. The spring 36 engages the lower annular face of the follower ring 34 and the upper face of the spring support ring 38. Thus, the spring 36 will urge the seal ring 32 upwardly and the taper on the recess will engage the taper on the seal ring providing sealing engagement of the seal ring 32 both with the exterior of the stem 18 and with the tapered portion of the recess 30 in the bonnet 16.

The seal ring 32 is preferably made from a material which will provide an adequate seal for the operating conditions of the valve while allowing the stem to be rotated for the seating and unseating of the valve member. A material such as the polytetrafluoroethylene line manufactured by Du Pont and sold under the trade name Teflon TFE has been found to be suitable for the seal ring 32.

The support ring 38, while providing support for the lower end of the spring 36, additionally surrounds the valve stem 18 to guide the valve stem 18 in its movement longitudinally of the bonnet 16. Further, the sealing means between the body and bonnet includes the spring support ring 38 which is formed to provide substantially a line contact seal on the circumference of a circle designated in FIGURE 2 as the point 40 between the spring support ring 38 and the lower edge of the bonnet 16 and also to provide substantially a line contact seal with the body 10 around the circumference of a circle designated 42. The bore through the support ring 38 is slightly larger than the stem or valve member 18 to allow freedom of movement and to guide the valve member in moving to and from a position closing the seat 24. The pressure within the valve body above the seat will be conducted through the small area between the stem 18 and the spring support ring 38 to urge the seal ring 32 upwardly. Thus the seal ring 32 in addition to being spring loaded by the spring 36 will also be pressure energized by the pressure at the inlet of the valve body when such pressure is greater than the external pressure around the valve. While in normal operation of such high pressure valves the pressure within the valve will exceed the external pressure, the spring 36 must be designed to have sufficient force to maintain the seal of the seal ring 32 under all conditions to which the valve may be expected to be exposed.

The valve member insert assembly 22 is best illustrated in FIGURE 3 wherein only the seat 24 of the body 10 and one side of the lower end of the valve member 18 are shown. The valve member 18 is prepared with an annular recess 44 which is adapted to receive the soft seat insert 46 which has the particular configuration hereinafter set forth and explained. Immediately therebelow the valve member 18 has a downwardly facing shoulder 48 against which the washer 50 abuts when the insert assembly has been assembled. The nut 52 is threadedly engaged with the valve member 18 and abuts the underside of the washer 50 to urge the washer upwardly into position against the shoulder 48 and to retain the soft seat insert 46 in the recess 44. It is generally preferred that the threads between the nut 52 and the lower end of the valve member 18 be left-hand threads so that the normal left-hand rotation of the valve stem 18 during unseating of the valve will not in any way loosen the nut 52 but will be in a direction to tighten the nut 52 onto the valve stem 18 to assure that the insert assembly 22 is retained in proper position to reseal against valve seat 24 when closed again.

The soft seat insert 46 and, therefore, the recess 44 are both formed to have the upstream side 54 at a substantial angle to the seating surface 56 which is generally parallel to the conical angle of the valve seat 24. The valve member 18 includes the hub 58 immediately above the recess 44 to provide reinforcement of the upstream surface of the insert 46.

The upper end of the valve member or stem 18 is provided with a suitable means, such as the handle H, for rotating the stem 18 to cause the valve member to move longitudinally to open and close the valve. Additionally, suitable means, such as the dust cap C, is provided in engagement with the stem 18 and the bonnet 16 to protect the threaded engagement from external dust, trash and weather conditions.

In actual operation, with the angle between the seating surface 56 and the upstream surface 54 for the soft seat insert 46 being larger than 90°, failure of the upstream corner of the insert has been eliminated. All soft seat inserts made to have the included angle between the surfaces 54 and 56 larger than a right angle have provided sufficient materials at the upstream corner 58 of the insert 46 to prevent any failure resulting from a bending or shearing of the corner because of the high pressure contained immediately above the corner 58 when it is seated.

As shown in FIGURE 3, the surfaces 54 and 56 have an included angle between them which is greater than a right angle, and further the two surfaces have the same angle with respect to a plane dividing the seat insert 46 in half. With this construction for the seat insert 46 it is symmetrical about such plane and, therefore, may be installed in the valve member 18 in either direction.

The material from which the seat insert 46 may be made should be partially resilient and have a limited cold flow characteristic. The following materials have been found to be suitable for use for the seat insert 46: polychlorotrifluoroethylene as made by Minnesota Mining and Manufacturing under the trade name Kel–F; polytetrafluoroethylene as made by Du Pont under the trade name Teflon TFE; acetal as made by Du Pont under the trade name Delrin; polyphenylene oxide as made by General Electric under the trade name PPO; vinylidene fluoride as made by Pennsalt under the trade name Kynar; and nylon as made by Du Pont under the trade name Zytel. The Teflon material may have limited application to lower pressure ranges since it will cold flow when exposed to extremely high pressures, i.e., it may permanently deform and such deformation may interfere with the proper seating of the valve.

It is believed that the reason for the greatly improved performance of the seat insert of the present invention results from the shape of the insert. With the angle between the seating surface and the upstream surface being approximately a right angle, the forces resulting from pressure on the upstream surface will be approximately parallel to the seating surface. Such forces, therefore, do not subject the upstream corner of the insert to shearing or bending stresses; and, therefore, the insert has a greatly improved useful life as compared to an insert having an upstream corner angle substantially less than a right angle. With the smaller upstream corner angles, the forces resulting from pressure are exerted in a direction crossing the seating surface and will tend to bend or shear the upstream corner of the insert when it is not seated. In operation, a seat insert having a corner angle between its upstream surface and its seating surface of 105 degrees has been found to provide satisfactory service in a high pressure valve and is not subjected to failure resulting from bending or shearing of the upstream corner.

From the foregoing it can be seen that the improved high pressure globe valve of the present invention includes an improved stem seal which is both spring loaded and pressure energized and supported by a spring support which guides the movement of the stem and provides line contact sealing between the bonnet and the body. Additionally, the soft seat insert of the valve member has a configuration providing sufficient material and strength to the upstream or pressure corner of the insert to prevent failure resulting from a feathering of the corner at the high pressures applied on top of the seat.

What is claimed is:

1. A high pressure valve comprising:
   a valve body having an inlet, an outlet, a fluid passageway therebetween and a valve seat surrounding said fluid passageway,
a bonnet secured to said body,
a valve member movably mounted in said bonnet for movement therein to open and close said valve seat,
a seal member sealing between said bonnet and said valve member,
resilient means urging said seal into sealing engagement with said bonnet and said valve member, and
a support for said resilient means,
said support having an outwardly projecting portion coacting with said body and said bonnet to establish line contact sealing engagements with both said body and said bonnet whereby said portion of said support seals between said body and said bonnet.

2. A high pressure valve comprising:
a valve body having an inlet, an outlet, a fluid passageway therebetween and a valve seat surrounding said fluid passageway,
a bonnet secured to said body,
a valve member adapted to move to and from said valve seat to open and close flow through said valve,
said valve member having a stem,
said stem threadedly engaged with said bonnet whereby rotation of said stem moves said valve member with respect to said valve seat,
said stem and said bonnet defining an annular recess at a position between said valve member and the threaded engagement between said stem and bonnet,
said annular recess tapering to a reduced cross-sectional area in a direction away from said body,
a sealing ring positioned in said recess to seal between said stem and bonnet,
a support member positioned in said body surrounding said stem,
a spring positioned in surrounding relation to said stem and between said support member and said sealing ring to urge said sealing ring toward the tapered end of of said recess,
said support being in sealing engagement with said body and said bonnet,
said valve seat having a conical surface, and
an insert for said valve member to engage and seal against said conical surface of said valve seat when said valve member is in closed position,
said insert having a seating surface for engagement with said valve seat surface and a pressure surface intersecting said seating surface at the high pressure side of said valve seat to define approximately a right angle therebetween.

3. A high pressure valve comprising:
a valve body having an inlet, an outlet, a fluid passageway therebetween and a valve seat surrounding said fluid passageway,
a bonnet secured to said body and defining a bore having internal threads therein,
a valve member having a seating surface adapted to engage said valve seat,
a valve stem secured to said valve member and having external threads adapted to engage the internal threads within said bonnet whereby rotation of said valve stem moves said valve member toward and away from said valve seat to open and close said fluid passageway,
said bonnet and said valve stem defining an annular outwardly narrowing recess positioned between the threads on said valve stem and said valve member,
an annular seal member positioned in said recess to engage the narrowing portion thereof,
resilient means urging said annular seal member outwardly against the narrowing portion of said annular recess to provide a seal between said bonnet and said stem whereby said threads on said stem and said bonnet are not subjected to pressure within said valve body, and
an annular support for said resilient means surrounding said valve stem,
said annular support having an outwardly extending portion coacting with said body and said bonnet to seal between said body and said bonnet.

4. A high pressure valve according to claim 3 wherein said annular seal member is made from polytetrafluoroethylene.

5. A high pressure valve according to claim 3 wherein the annular seal member is exposed to fluid pressure within said valve body whereby said resilient means provides the force for initial sealing of said seal member and the fluid pressure in said valve body maintains said seal member in sealing engagement in said recess.

6. A high pressure valve comprising:
a valve body having an inlet, an outlet, a fluid passageway therebetween and a frusto-conical valve seat surrounding said fluid passageway,
a valve member movably mounted with respect to said body to open and close flow through said valve seat,
means sealing between said valve member and said body, and
an annular seat insert in said valve member having a frusto-conical seating surface adapted to engage said valve seat,
the upstream corner of said seat insert having an angle of at least 90° with respect to the frusto-conical seating surface of said seat insert to direct resulting forces from pressure in a direction approximately parallel with the seating surface of said seat insert.

7. A high pressure valve according to claim 6 wherein said annular seat insert is made from a material selected from the group consisting of polychlorotrifluoroethylene, acetal, polyphenylene oxide, vinylidene fluoride and nylon.

8. A high pressure valve according to claim 6 wherein said annular seat insert is made from polytetrafluoroethylene.

9. A high pressure valve comprising:
a valve body having an inlet, an outlet, a fluid passageway therebetween and a frusto-conical valve seat surrounding said fluid passageway,
a valve member movably mounted with respect to said body,
said valve member having a frusto-conical surface for mating with the frusto-conical valve seat and defining an annular recess in said surface, and
an insert assembly including an annular seat insert and retaining means,
said seat insert being positioned within said recess in said valve member and having a frusto-conical seating surface adapted to engage said frusto-conical valve seat,
said seating surface on said seat insert extending outwardly beyond the frusto-conical surface of said valve member whereby when said valve member is moved to close position on said valve seat, said seating surface of said seat insert engages said valve seat before said frusto-conical surface of said valve member engages said valve seat,
the upstream corner of said seat insert having an angle of at least 90° to direct forces resulting from pressure in a direction approximately parallel with the seating surface of said seat insert whereby damage to said seat insert is prevented.

10. A high pressure valve according to claim 9 wherein both the upstream and downstream corners of said seat insert form angles of at least 90° with said frusto-conical seating surface of said seat insert.

11. A high pressure valve according to claim 10 wherein said seat insert is symmetrical about a plane extending at right angles to the axis of said annular seat insert whereby said seat insert may be installed in said recess in either direction.

12. A high pressure valve according to claim 10 wherein said retaining means includes:
- an annular ring adapted to engage the downstream surface of said seat insert, and
- means securing said ring on said valve member whereby said ring is spaced from said valve seat in all positions of said valve member.

References Cited

UNITED STATES PATENTS

| | | | |
|---|---|---|---|
| 3,321,176 | 5/1967 | Bolling | 251—17 X |
| 2,982,296 | 5/1961 | Ohls et al. | 251—214 X |
| 2,985,424 | 5/1961 | Anderson et al. | 251—357 X |

WILLIAM F. O'DEA, Primary Examiner

DAVID R. MATTHEWS, Assistant Examiner

U.S. Cl. X.R.

251—215, 332, 333, 360, 367; 277—115